(12) United States Patent
Cheiky et al.

(10) Patent No.: US 6,943,530 B2
(45) Date of Patent: Sep. 13, 2005

(54) BATTERY CHARGING SYSTEM

(75) Inventors: Michael Cheiky, Santa Barbara, CA (US); Te-Chien F. Yang, Santa Barbara, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 0 days.

(21) Appl. No.: 10/810,205

(22) Filed: Mar. 26, 2004

(65) Prior Publication Data

US 2004/0178772 A1 Sep. 16, 2004

Related U.S. Application Data

(62) Division of application No. 10/022,450, filed on Dec. 16, 2001.

(51) Int. Cl.$^7$ .................................................. H02J 7/04
(52) U.S. Cl. .................................... 320/162; 320/137
(58) Field of Search ............................ 320/162, 137, 320/141, 142, 143, 144, 145, 160, 163, 164; 323/266, 268, 299

(56) References Cited

U.S. PATENT DOCUMENTS

| | | | |
|---|---|---|---|
| 3,708,738 A | 1/1973 | Crawford et al. | 320/134 |
| 4,113,921 A | 9/1978 | Goldstein et al. | 429/27 |
| 4,388,582 A | 6/1983 | Saar et al. | 320/156 |
| 4,392,101 A | 7/1983 | Saar et al. | 320/156 |
| 4,719,401 A | 1/1988 | Altmejd | 320/122 |
| 4,745,349 A | 5/1988 | Palanisamy et al. | 320/125 |
| 5,049,803 A | 9/1991 | Palanisamy | 320/132 |
| 5,089,765 A | 2/1992 | Yamaguchi | 320/164 |
| 5,160,880 A | 11/1992 | Palanisamy | 320/106 |
| 5,166,596 A | 11/1992 | Goedken | 320/150 |
| 5,204,611 A | 4/1993 | Nor et al. | 320/145 |
| 5,270,635 A | 12/1993 | Hoffman et al. | 320/122 |
| 5,307,000 A | 4/1994 | Podrazhansky et al. | 320/129 |
| 5,387,857 A | 2/1995 | Honda et al. | 320/120 |
| 5,396,163 A | 3/1995 | Nor et al. | 320/159 |
| 5,438,250 A | 8/1995 | Retzlaff | 320/128 |
| 5,642,031 A | 6/1997 | Brotto | 320/156 |
| 5,721,688 A | 2/1998 | Bramwell | 702/63 |
| 5,747,964 A | 5/1998 | Turnbull | 320/124 |
| 5,821,733 A | 10/1998 | Turnbull | 320/116 |
| 5,982,144 A | 11/1999 | Johnson et al. | 320/122 |
| 5,982,151 A * | 11/1999 | Nagai et al. | 320/141 |
| 6,025,696 A | 2/2000 | Lenhart et al. | 320/122 |

(Continued)

FOREIGN PATENT DOCUMENTS

| | | |
|---|---|---|
| EP | 1076397 A1 | 2/2001 |
| FR | 2683093 A1 | 4/1993 |
| GB | 892954 | 4/1962 |
| GB | 2178608 A | 2/1987 |
| WO | WO00/14848 | 3/2000 |
| WO | WO01/47086 | 6/2001 |

*Primary Examiner*—Donald Sparks
*Assistant Examiner*—Lawrence Luk
(74) *Attorney, Agent, or Firm*—Marvin E. Jacobs

(57) ABSTRACT

A battery charging system comprising: a current source; a battery; and a voltage and current regulator, which regulates voltage applied to the battery and current supplied to the battery. The battery charging system shapes the current supplied to the battery, and may be used to taper the current supplied to the battery. The voltage and current regulator may comprise: an adjustable band-gap voltage reference diode, a potentiometer, a resistor, and a transistor, or an adjustable shunt regulator, and a transistor operating in conjunction with the adjustable shunt regulator, or other suitable voltage and current regulator means. The battery charging system regulates the current flow supplied to the battery, which originates from a constant charging current source. As the battery voltage exceeds a predefined terminal voltage, the battery charging system diverts charging current through a transistor, thus clamping the battery at the terminal voltage and shaping the current supplied to the battery.

6 Claims, 9 Drawing Sheets

U.S. PATENT DOCUMENTS

| | | | |
|---|---|---|---|
| 6,037,751 A | 3/2000 | Klang | 320/160 |
| 6,097,172 A | 8/2000 | Podrazhansky et al. | 320/107 |
| 6,104,167 A | 8/2000 | Bertness et al. | 320/132 |
| 6,124,700 A | 9/2000 | Nagai et al. | 320/132 |
| 6,137,268 A | 10/2000 | Mitchell et al. | 320/149 |
| 6,215,291 B1 | 4/2001 | Mercer | 323/313 |
| 6,215,312 B1 | 4/2001 | Hoenig et al. | 324/427 |
| 6,222,343 B1 | 4/2001 | Crisp et al. | 320/110 |
| 6,232,750 B1 | 5/2001 | Podrazhansky et al. | 320/139 |
| 6,252,373 B1 | 6/2001 | Stefansson | 320/106 |
| 2002/0199131 A1 * | 12/2002 | Kocin | 714/14 |

\* cited by examiner

BATTERY CHARGING SYSTEM

This application is a division of U.S. patent application Ser. No. 10/022,450, filed Dec. 16, 2001.

BACKGROUND OF THE INVENTION

1. Field of the Invention

The present invention relates generally to battery charging systems and more particularly to charging systems for preventing battery overcharge.

2. Cross-References

The present application is related to two copending applications, each entitled "Battery Charging Method and System," each by inventors Michael Cheiky and Te-Chien Felix Yang, serial numbers to be determined, each filed Dec. 14, 2001, which are included herein by this reference, and which are not admitted to be prior art with respect to the present invention.

3. Background Art

Rechargeable batteries, for storing electrical energy, and battery chargers, for charging batteries and bringing the batteries back to a charged state, after the batteries have been depleted, have been known and are common. Typically, the batteries are charged after full or partial depletion by delivering energy to the batteries and reversing chemical processes within the batteries, by applying a voltage to the batteries, forcing current through the batteries, and, thus, restoring charge. A common charging technique is to apply a voltage source to the battery to be charged, which is greater than the battery voltage of the battery, and stop charging when the battery ceases to accept additional current. This almost always results in deleterious effects on the battery, reduces performance and battery life.

Batteries generally consist of two or more galvanic cells. Two electrodes of dissimilar materials are isolated one form the other electronically, but placed in a common ionically conductive electrolyte. Overcharge of the battery can lead to complicated and undesirable side reactions, in particular as they pertain to the decomposition of electrolyte. The latter can lead to gas production, which in turn leads to increased battery internal impedance. The battery with this increased battery internal impedance can quickly stray from optimum operating conditions. Additionally, overcharging promotes the growth of dendrites, which in turn leads to battery shorting. On other hand, present demands upon batteries call increasingly for greater power densities, so that undercharge is also to be avoided in any charging scheme.

Silver-based batteries typically have high energy densities, i.e., high energy to weight and volume ratios, an ability to deliver energy at relatively high current drains, and high reliability, making them excellent candidates for use in next generation technologies, as well as meeting current day energy storage and delivery demands. Thus, there is a need for a charging system that minimizes the deleterious effects of overcharging.

The charging of silver-based batteries is characterized by two plateaus, reflecting the two active oxidation states of silver. The first plateau occurs as silver is transformed to monovalent silver oxide ($Ag_2O$) while the second plateau reflects the formation of divalent silver (AgO). Towards the end of charge, generally at approximately 90% of maximum capacity, the plateau transforms into a steeply rising curve and the battery begins to be overcharged. Consequently, a battery charging system that limits the maximum charging voltage and charging current is needed. The battery charging system should taper charge the battery, so as not to drive too much energy into the battery too fast, and, thus, prevent damage to the battery.

With the advent of more sophisticated and expensive battery systems, such as silver-based batteries and other high impedance batteries, the need arises for more advanced charging systems and methods, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging system should be inexpensive, easy to manufacture and use, small and light weight, durable, long lasting, reliable, and capable of being used in aerospace and defense applications.

Different battery charging systems have heretofore been known. However, none of these battery charging systems satisfies these aforementioned needs.

Different charging systems, using shunt regulators have been disclosed.

U.S. Pat. No. 5,821,733 (Turnbull) and U.S. Pat. No. 5,747,964 (Turnbull) disclose rechargeable batteries and battery charging systems for multiple series connected battery cells which include a plurality of shunt regulators, adapted to be connected in parallel with each of the cells. The voltage of each cell is monitored during charging. When a cell is fully charged, excess charging current is shunted around the fully charged cell to enable the remaining cells to continue to charge.

Turnbull shows different embodiments of his shunt regulators. In one of Turnbull's embodiments, Turnbull simply shows shunt regulators, each in parallel with a battery cell. In another embodiment, Turnbull uses shunt regulators and field effect transistors, whose drain and source terminals are connected in parallel across each of the battery cells. Each shunt regulator is under the control of a voltage sensing circuit, which includes a differential amplifier which senses the actual cell voltage of the battery cell and compares it with a reference voltage, elsewhere in the charging circuit. In yet another embodiment, Turnbull uses a plurality of isolation switches to disconnect the battery cells from the charging circuit to prevent the battery circuit from discharging the cells when the battery charger is not being used.

U.S. Pat. No. 5,982,144 (Johnson et al) discloses a rechargeable power supply overcharge protection circuit with shunt circuits that shunt current about a battery or battery cell of a string of battery cells, when it is charged to a maximum charge limit. The shunt circuit includes shunt regulators connected across each battery cell.

U.S. Pat. No. 6,025,696 (Lenhart et al) discloses a battery cell bypass module having a sensor for detecting an operating condition of a battery cell, such as voltage or temperature, and a controller connected across the battery cell of a lithium ion battery, the controller then being operable to change to the conductive mode and thereby shunt current around the battery cell. The controller includes a voltage limiting operational amplifier operable for transmitting a voltage excessive output signal, when the input thereto exceeds a predetermined value, and a transistor having a predetermined gate voltage allowing bypass current flow, the transistor being responsive to the voltage excessive output signal from the voltage limiting operational amplifier to shunt current around the battery cell.

U.S. Pat. No. 4,719,401 (Altmejd) discloses zener diodes, each of which are shunted across each cell in a series connected string of battery cells.

Different charging systems and methods, using plateaus and inflection points have been disclosed.

U.S. Pat. No. 5,642,031 (Brotto) discloses a battery recharging system with state of charge detection, that initially detects whether a battery to be charged is already at or near full charge to prevent overcharging. A state of charge test is first performed on the battery, by applying a current pulse and then observing the voltage decay characteristics which result, batteries which are initially nearly fully charged exhibiting a larger voltage decay than batteries which are not as fully charged. The result of this initial state of charge test is used to determine how to best terminate battery charging.

U.S. Pat. No. 4,392,101 (Saar et al) and U.S. Pat. No. 4,388,582 (Saar et al) disclose a method and apparatus of fast charging batteries by means of analysis of the profile of the variation with time of a characteristic of the battery, which is indicative of the variation in stored chemical energy as the battery is charged. The method comprises analyzing the profile for the occurrence of a particular series of events, preferably including one or more inflection points, which identify the point in time at which the application of a fast charge rate should be discontinued. Additional methods of analysis provide for termination or control of the charging current, upon the occurrence of other events such as limiting values on time, voltage or voltage slope, or a negative change in the level of stored energy. The variation of the characteristic with time is analyzed, preferably by measuring successive values of the characteristic, computing the slope and comparing successive slope values so as to identify inflection points and other significant events in the variation of the characteristic. Apparatus for performing these methods comprises a power supply and a microcomputer for analyzing the profile and controlling the power supply.

Saar and Brotto show a voltage-time curve, which can be separated into at least four distinct regions. Region I represents the beginning of the charging sequence just after the battery is initially attached to the charger and the charging begins. After the charging sequence passes through region I, the charging curve will enter a more stable region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point in the curve, which represents a transition from region II to region III, and is noted by a point where the slope of the curve changes from a decreasing rate to an increasing rate. Region III is the region in which the battery voltage begins to increase rapidly with respect to time, thus, representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as another inflection point and is also characterized by the sharp fall in the voltage derivative curve dV/dt. Region IV represents the fully charged region following the latter inflection point and including the charge termination target. The charging voltage only stabilizes at the charge termination target for a very short period of time. Consequently, if charging continues, the additional heating within the battery will cause the voltage of the battery to decrease and in addition may cause damage to the battery.

U.S. Pat. No. 6,215,312 (Hoenig et al) discloses a method and apparatus for analyzing an AgZn battery, which diagnoses the status of the battery having high and low voltage plateau states corresponding to its state of charge.

Other fast charging devices and methods have been disclosed, some of which are complicated and involved.

U.S. Pat. No. 5,307,000 (Podrazhansky et al) discloses a method and apparatus, which uses a sequence of charge and discharge pulses. The discharging pulses preferably have a magnitude, which is approximately the same as the magnitude of the charging pulses, but which have a duration which is substantially smaller than the duration of the charging pulses. The discharging pulse causes a negative-going spike, which is measured and prompts the charging to stop.

U.S. Pat. No. 6,097,172 (Podrazhansky et al) discloses an apparatus and method for charging a battery in a technique wherein charge pulses are followed by discharge pulses and then first rest periods and other discharge pulses followed by second rest periods. Selected ones of the second rest periods are extended in time to enable a battery equilibrium to be established and the open circuit voltage of the battery to settle down and reflect an overcharging condition of the battery. By comparing the open circuit voltages measured during different extended second rest periods small voltage decreases are detected and used to determine an overcharging condition, such as when gases are generated and affect the open circuit voltage. Once overcharging is detected the battery charging is stopped. U.S. Pat. No. 6,232,750 (Podrazhansky et al) also discloses another battery charger, which rapidly charges a battery utilizing a bipolar waveform.

U.S. Pat. No. 5,204,611 (Nor et al) and U.S. Pat. No. 5,396,163 (Nor et al) disclose circuits in which rechargeable batteries and cells are fast charged by a controlled current, and substantially at a rate not exceeding the ability of the battery or cell to accept current. The resistance free terminal voltage of the battery or cell is detected during an interval when the charging current is interrupted, and compared against an independent reference voltage to control the charging current when a difference between the reference voltage and the sensed resistance free terminal voltage exists.

Different charging systems and methods, using time as a factor in charging have been disclosed.

U.S. Pat. No. 6,137,268 (Mitchell et al) discloses a battery charging system in which current is averaged over a long time period (seconds) to determine the maximum average charging rate. When the integral of charging current over this long time period reaches the programmed maximum charge value for one period, current is simply cut off for the remainder of the fixed long period.

U.S. Pat. No. 6,215,291 (Mercer) discloses a control circuit, having a bandgap reference circuit, which minimizes the charging cycle time of a battery charging system, by maximizing the length of time that high constant charging current is applied to a discharged battery.

Other charging devices, batteries, and methods have been disclosed, which still do not satisfy the aforementioned needs.

U.S. Pat. No. 5,166,596 (Goedken) discloses a battery charger having a variable-magnitude charging current source. U.S. Pat. No. 6,222,343 (Crisp et al) discloses a battery charger, which is capable of charging different types of batteries, a method for charging a battery, and a software program for operating the battery charger.

U.S. Pat. No. 5,387,857 (Honda et al); U.S. Pat. No. 5,438,250 (Retzlaff); U.S. Pat. No. 6,215,291 (Ostergaard et al); U.S. Pat. No. 6,037,751 (Klang); U.S. Pat. No. 5,089,765 (Yamaguchi); U.S. Pat. No. 4,113,921 (Goldstein et al); U.S. Pat. No. 5,049,803 (Palanisamy) U.S. Pat. Nos. 5,160,880 6,124,700 (Nagai et al); (Palanisamy) U.S. Pat. No. 4,745,349 (Palanisamy); U.S. Pat. No. 5,721,688, (Bramwell); U.S. Pat. No. 6,252,373 (Stefansson); U.S. Pat. No. 5,270,635 (Hoffman et al); U.S. Pat. No. 6,104,167 (Bertness et al); U.S. Pat. No. 3,708,738 (Crawford et al); British Patent Nos. GB2178608A (Yu Zhiwei) and 892,954 (Wolff); World Patent Nos. WO00/14848 (Simmonds) and WO01/47086 (Gabehart et al); French Patent No. FR2683093-A1 (Michelle et al); and European Patent Application No. EP1076397A1 (Klang) each disclose other devices, batteries, and methods, which do not satisfy the aforementioned needs.

For the foregoing reasons, there is a need for a charging system that minimizes the deleterious effects of overcharging. The charging system should limit the maximum charging voltage and charging current applied to the battery, and should taper charge the battery, so as not to drive too much energy into the battery too fast, and, thus, prevent damage to the battery. With the advent of more sophisticated and expensive battery systems, such as silver-based batteries and other high impedance batteries, the need arises for more advanced charging systems and methods, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging system should be inexpensive, easy to manufacture and use, small and light weight, durable, long lasting, reliable, and capable of being used in aerospace and defense applications.

SUMMARY

The present invention is directed a battery charging system that minimizes the deleterious effects of overcharging. The charging system limits the maximum charging voltage and charging current applied to the battery, and taper charges the battery, so as not to drive too much energy into the battery too fast and, thus, prevent damage to the battery. With the advent of more sophisticated and expensive battery systems, such as silver-based batteries and other high impedance batteries, the need arises for more advanced charging systems and methods, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging system of the present invention limits the maximum charging voltage and charging current applied to the battery, and taper charges the battery, is additionally inexpensive, easy to manufacture and use, small and light weight, durable, long lasting, reliable, and capable of being used in aerospace and defense applications, and satisfies the aforementioned needs.

A battery charging system having features of the present invention comprises: a current source; a battery; and a voltage and current regulator, which regulates voltage applied to the battery and current supplied to the battery. The battery charging system shapes the current supplied to the battery, and may be used to taper the current supplied to the battery. The voltage and current regulator may comprise: an adjustable band-gap voltage reference diode, a potentiometer, a resistor, and a transistor, or an adjustable shunt regulator, and a transistor operating in conjunction with the adjustable shunt regulator, or other suitable voltage and current regulator means. The battery charging system regulates the current flow supplied to the battery, which originates from a constant charging current source. As the battery voltage exceeds a predefined terminal voltage, the battery charging system diverts charging current through a transistor, thus clamping the battery at the terminal voltage and shaping the current supplied to the battery.

DRAWINGS

These and other features, aspects, and advantages of the present invention will become better understood with regard to the following description, appended claims, and accompanying drawings where:

DESCRIPTION

The preferred embodiments of the present invention will be described with reference to FIGS. 1–9 of the drawings. Identical elements in the various figures are identified with the same reference numbers.

Figure 1:
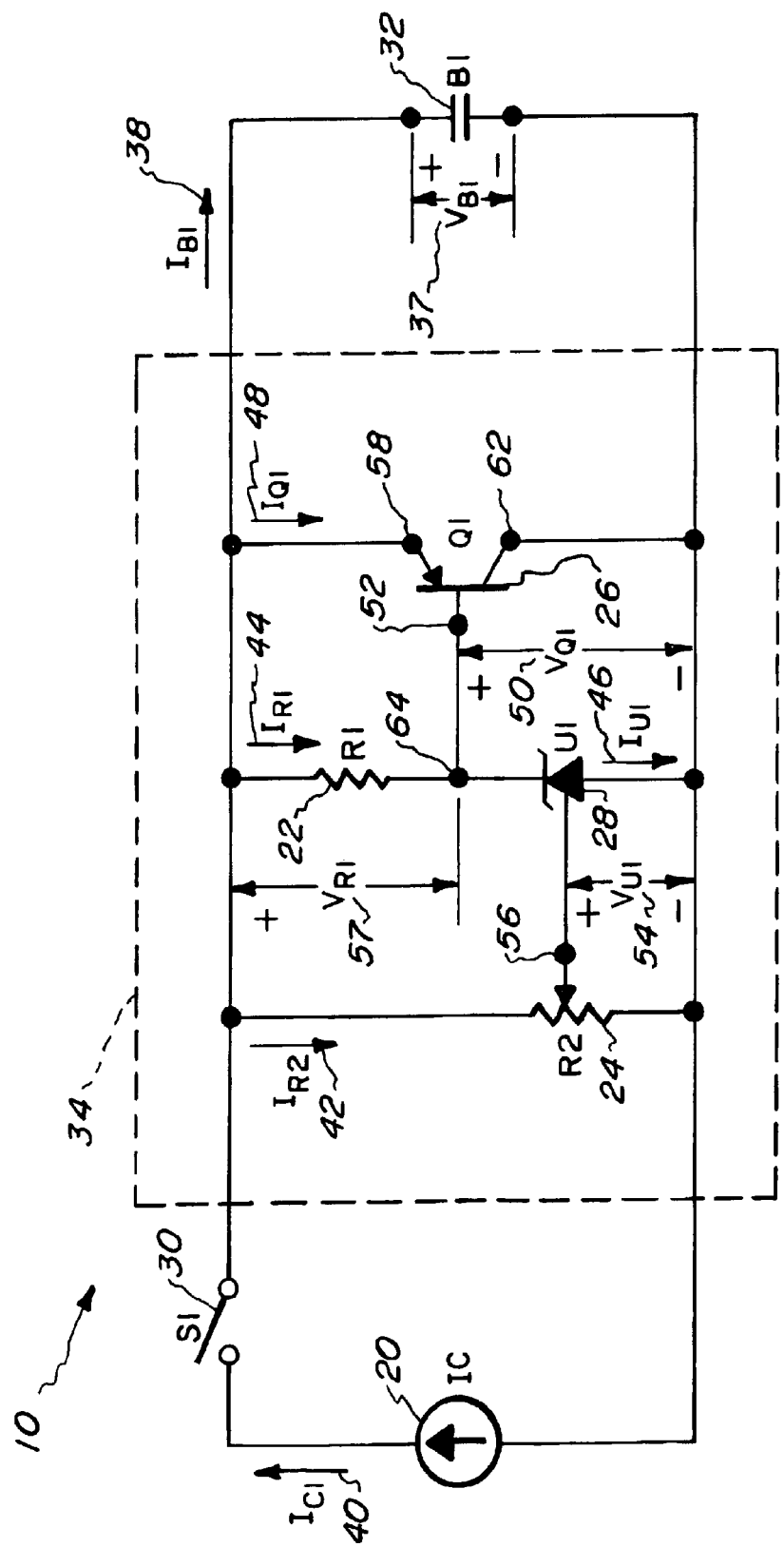
FIG. 1 is a schematic diagram of a battery charging system, constructed in accordance with the present invention.

FIGS. 1 shows a circuit diagram of an embodiment of the present invention, a battery charging system 10 having a current source Ic (20), resistor R1 (22), potentiometer R2 (24), transistor Q1 (26), and an adjustable band-gap voltage reference diode U1 (28), switch S1 (30), and battery B1 (32). The battery charging system 10 is directed particularly to charging silver-based batteries and other high impedance batteries, but may be used with other suitable batteries, as well.

Figure 2:
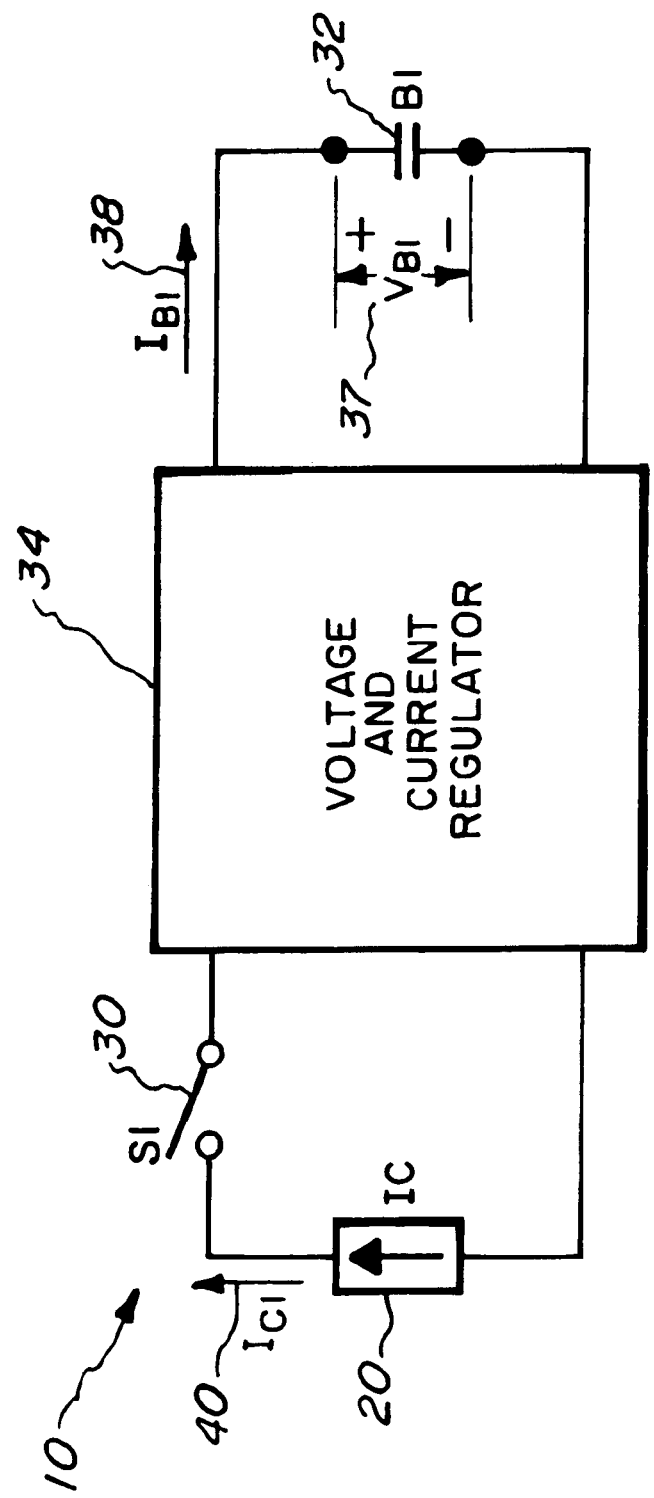
FIG. 2 is a block diagram of the battery charging system of FIG. 1.
Figure 3:
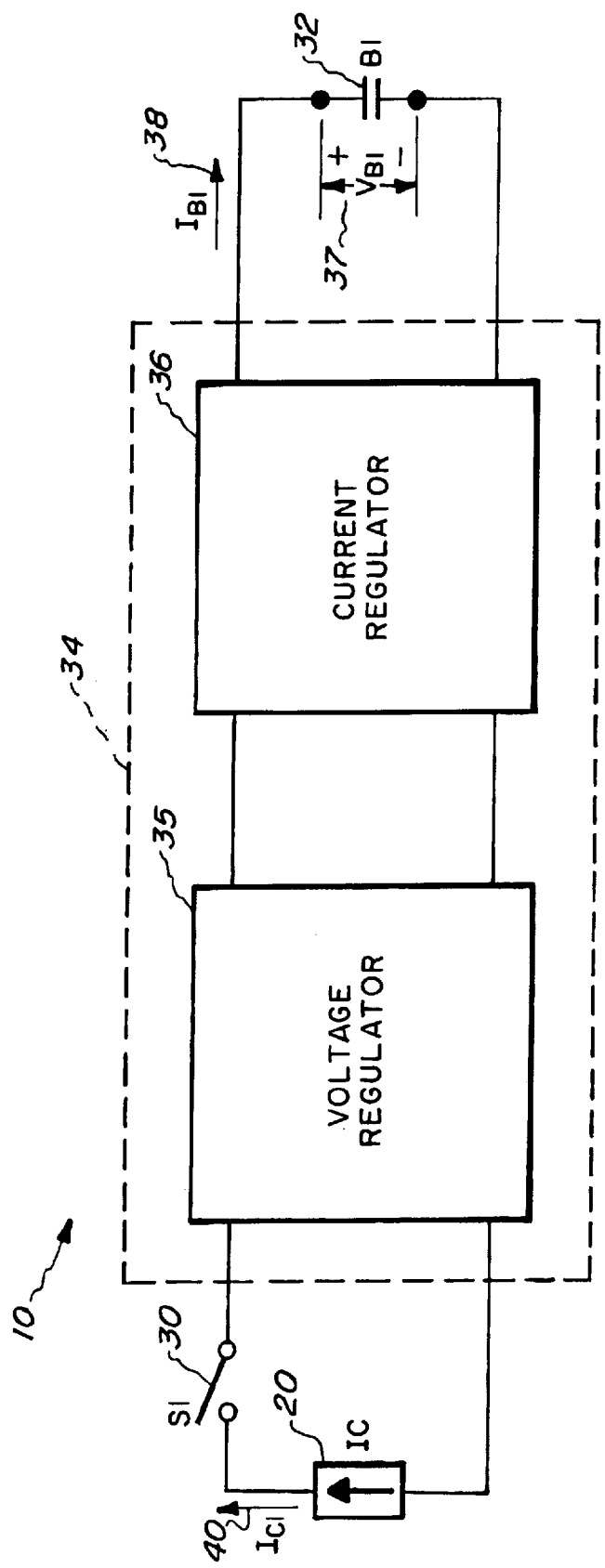
FIG. 3 is a more detailed block diagram of the battery charging system of FIG. 1.

The current source Ic (20) supplies current to voltage and current regulator (34), having voltage regulator means (35) and current regulator means (36), comprising the resistor R1 (22), the potentiometer R2 (24), the transistor Q1 (26), and the adjustable band-gap voltage reference diode U1 (28). The voltage and current regulator (34) regulates battery voltage $V_{B1}$ (37) and battery current $I_{B1}$ (38) supplied to the battery B1 (32), when the switch S1 (30) is closed, and, thus, completes a circuit. The voltage and current regulator (34) is also shown in FIGS. 2 and 3.

The voltage regulator means (35), which regulates the battery voltage $V_{B1}$ (37) applied to the battery B1 (32), comprises the resistor R1 (22), the potentiometer R2 (24), and the adjustable band-gap voltage reference diode U1 (28), but may be a shunt regulator and preferably an adjustable shunt regulator or any suitable voltage regulator. The current regulator means (36), which regulates the battery current $I_{B1}$ (38) supplied to the battery B1 (32), comprises the resistor R1 (22), the transistor Q1 (26), and the adjustable band-gap voltage reference diode U1 (28), but may be any suitable current regulator. The current regulator means (36) allows the battery B1 (32) to be taper charged, i.e., the battery current $I_{B1}$ (38) supplied to the battery B1 (32) is tapered, and the current regulator means (36) may be used to shape the battery current $I_{B1}$ (38) supplied to the battery B1 (32). Components which perform more than one function and operate in conjunction with one another in the present embodiment of the battery charging system 10 help keep costs down and simplifies circuitry, but other suitable voltage and current regulator circuits may be used. The voltage regulator means (35) and the current regulator means (36) operate in conjunction with one another in the present embodiment of the battery charging system 10; however, other suitable embodiments may be used.

At the start of charging, when the battery B1 (32) is substantially discharged, the battery B1 (32) has substantially the lowest impedance in the battery charging system 10, and source current $I_{c1}$ (40) flows almost entirely through the battery B1 (32). Under these circumstances, the following conditions are satisfied: $I_{R2}, I_{R1}, I_{U1}, I_{Q1} \ll I_{B1} \approx I_{c1}$, where: $I_{R2}$ (42) is the current through the potentiometer R2 (24); $I_{R1}$ (44) is the current through the resistor R1 (22); $I_{U1}$ (46) is the current through the adjustable band-gap voltage reference diode U1 (28); and $I_{Q1}$ (48) is the current through the transistor Q1 (26).

Typical values of $I_{Q1}$ (48) at the start of charging, which is the current through the transistor Q1 (26), range from 10 to 100 micro amperes, while those of the source current $I_{c1}$ (40) and the battery current $I_{B1}$ (38) range from 150 milliamperes to 2 amperes for a typical silver-based battery, during this period, although other values are possible depending upon the type of battery being charged.

As the battery B1 (32) is being charged, the battery voltage $V_{B1}$ (37) increases, and the impedance of the battery B1 (32) rises. More current $I_{R1}$ (44) starts to flow through the resistor R1 (22) and the adjustable band-gap voltage reference diode U1 (28), prompting the transistor Q1 (26) to turn on and increase the current $I_{Q1}$ (48) through the transistor Q1 (26), shunting the battery current $I_{B1}$ (38) from the battery B1 (32), and decreasing the battery current $I_{B1}$ (38), as the battery B1 (32) approaches a substantially fully charged condition. The charging system 10 of the present invention limits the maximum charging voltage and charging current applied to the battery B1 (32) and taper charges the battery B1 (32).

The battery B1 (32) is taper charged during the battery B1 (32) final charging stage with the battery voltage $V_{B1}$ (37) tightly regulated. Turn-on voltage $V_{Q1}$ (50) at base 52 of the transistor Q1 (26) is adjustable, by adjusting reference voltage $V_{U1}$ (54) of the adjustable band-gap voltage reference diode U1 (28) with the potentiometer R2 (24), which provides control of regulation and charging.

The battery charging system 10, thus, regulates the battery current $I_{B1}$ (38) supplied to the battery B1 (32), which originates from the current source Ic (20), which is a constant charging current source. As the battery voltage $V_{B1}$ (37) exceeds a predefined terminal voltage, the battery charging system 10 diverts the battery current $I_{B1}$ (38) from the battery B1 (32), through the transistor Q1 (26), thus clamping the battery voltage $V_{B1}$ (37) at the terminal voltage and shaping the current supplied to the battery B1 (32).

The battery charging system 10, shown in FIG. 1, comprises: the current source Ic (20); the battery B1 (32); the adjustable band-gap voltage reference diode U1 (28) in series with the resistor R1 (22), the series resistor R1 (22) and the adjustable band-gap voltage reference diode U1 (28) connected across the current source Ic (20) and the battery B1 (32), the adjustable band-gap voltage reference diode U1 (28) having a reference input 55; the potentiometer R2 (24), which may be a voltage divider, connected across the current source. Ic (20) and the battery B1 (32), the potentiometer R2 (24) having an output 56 connected to the reference input 55 of the adjustable band-gap voltage reference diode U1 (28), and providing the reference voltage $V_{U1}$ (54) at the reference input 55 of the adjustable band-gap voltage reference diode U1 (28); and the transistor Q1 (26) having an emitter 58 and a collector 62 connected across the current source Ic (20); the battery B1 (32), the transistor Q1 (26) having the base 52 connected to a junction 64 between the series resistor R1 (22) and the adjustable band-gap voltage reference diode U1 (28), the adjustable band-gap voltage reference diode U1 (28), the resistor R1 (22), and the transistor Q1 (26) operating in conjunction with one another to regulate voltage applied to the battery B1 (32) and current supplied to the battery B1 (32). The switch S1 (30), which is in series with the current source Ic (20), may be used to control current supplied to the battery B1 (32) by switching the current source Ic (20) on or off. Although the circuitry of the present invention of the battery charging system 10, shown in FIG. 1, has been described in considerable detail, other versions are possible, and may be used, as well.

The voltage drop $V_{R1}$ (57) across the resistor R1 (22) should be sufficiently large to 15 prevent the current $I_{U1}$ (46)

through the adjustable band-gap voltage reference diode U1 (28) from being too large, but the current $I_{R1}$ (44) the resistor R1 (22) should be large enough to drive the transistor Q1 (26). Typically, the resistor R1 (22) is in the range of 0.7 to 1.2 K and preferably 1K, but may be another suitable value, depending on the type of battery being charged. The transistor Q1 (26) may be any suitable p-n-p transistor able to sustain the source current $I_{c1}$ (40), such as Zetex ZTX751, or other suitable transistor. The adjustable band-gap voltage reference diode U1 (28) should have a wide enough voltage range to cover the voltages $V_{B1}$ (37) achieved by the battery B1 (32). Typically, for silver-zinc batteries, for example, the relevant voltage range of the battery B1 (32) is between 1.6V and 2.1V, but may have other values for different types of batteries. Elements such as National Semiconductor LM3856Z or Zetex ZR431LC01 or other suitable adjustable-band gap voltage diode may be used for the adjustable band-gap voltage reference diode U1 (28). The potentiometer R2 (24) adjusts the operating value of the adjustable band-gap voltage reference diode U1 (28), and should have a range of 100 to 300K, but may have other values, depending upon the type of battery B1 (32) being charged. A voltage divider or series resistors may be used alternatively to the potentiometer R2 (24). The switch S1 (30) may be any suitable switch, and may be mechanical, a transistor or a microcontroller-controlled switch or other suitable switch.

A non-obvious aspect of the battery charging system 10 of the present invention relates to the end voltage of a silver-based battery. The minimum reference voltage $V_{U1}$ (54) of the adjustable band-gap voltage reference diode U1 (28) is typically in the range of 1.24 volts. The ensuing voltage drop $V_{R1}$ (57) across the resistor R1 (22) and the minimum reference voltage $V_{U1}$ (54) of the adjustable band-gap voltage reference diode U1 (28) set the minimum cutoff voltage of the battery charging system 10 in the range of 1.2 to 1.4 volts. Fortuitously, this cutoff voltage is below the first plateau of a charged silver-zinc battery or silver-cadmium battery, which is 1.60 volts for the silver-zinc battery and 1.25 volts for the silver-cadmium battery, respectively. This condition might not be applicable for some other batteries, such as nickel-metal hydride, where the open circuit full-charge voltage is 1.2 volts.

The battery charging system 10 regulates, shapes current supplied to the battery B1 (32), and shunts current away from the battery B1 (32), as the battery B1 (32) approaches full charge. The battery charging system 10 is particularly useful for batteries having large internal impedances (greater than 100 milliohms) and multiple plateaus, but may be used for other types of batteries, as well. Silver-based batteries, such as, for example, silver-zinc, silver-cadmium, and silver-nickel metal hydride batteries have relatively large internal impedances, of the order of 100 to 200 milliohms. The battery charging system 10 of the present embodiment regulates, shapes, and shunts current at an appropriate predetermined voltage via. The use of the adjustable band-gap voltage reference diode U1 (28) and a transistor which acts in parallel with the battery B1 (32).

Figure 4:
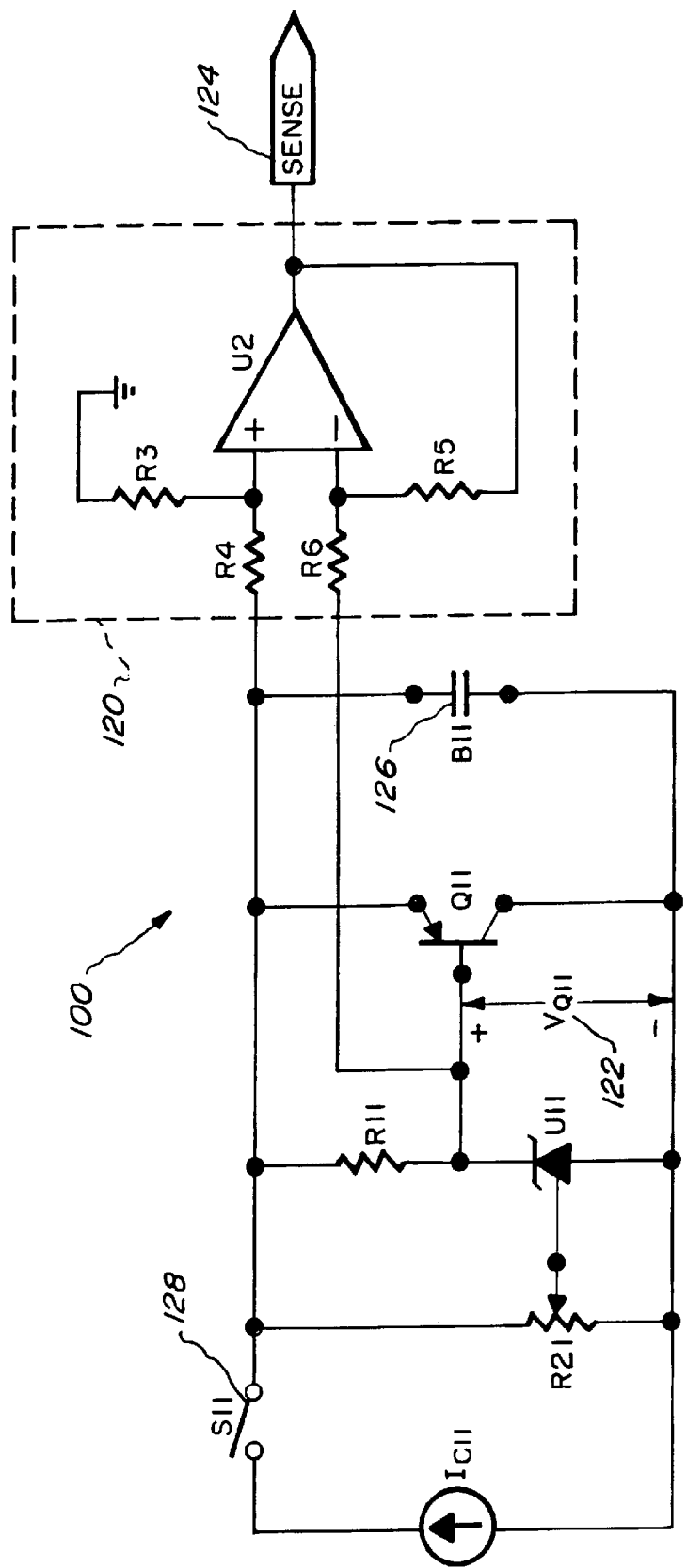
FIG. 4 is a schematic diagram of an alternate embodiment of a battery charging system, constructed in accordance with the present invention.

FIG. 4 shows an alternate embodiment of a battery charging system 100, which is substantially the same as the battery charging system 10, except that the charging system 100 has an operational amplifier 120, which is used to amplify voltage $V_{R11}$ (122), and provide amplified and buffered output 124 for use with auxiliary devices. The amplified and buffered output 124 may be used to feed auxiliary devices, such as a microcontroller or indicator device, such as a light emitting diode (LED), or other suitable device. Such auxiliary devices may be programmed in conjunction with other control functions and/or methods, and indicate cutoff voltage. The operational amplifier 120 may be National Semiconductor LM2902 or other suitable operational amplifier.

The amplified and buffered output 124, which is indicated as $V_{sense}$ below, is simply:

$$V_{sense} = R3/R4 * V_{R11}$$

The resistors should obey the relationship
R3/R4=R5/R6, where R3, R4, R5, and R6, are the values of the resistors R3, R4, R5, and R6, respectively.

For proper current flow into the operational amplifier 120, R4 and R6 should preferably have values above 10K, although other values may be possible. All resistors should preferably have tolerances better than 1%, although higher tolerances may be used, depending upon the requirements of the battery charging system 100, the types of batteries being charged, microcontroller, and program requirements.

Figure 5:
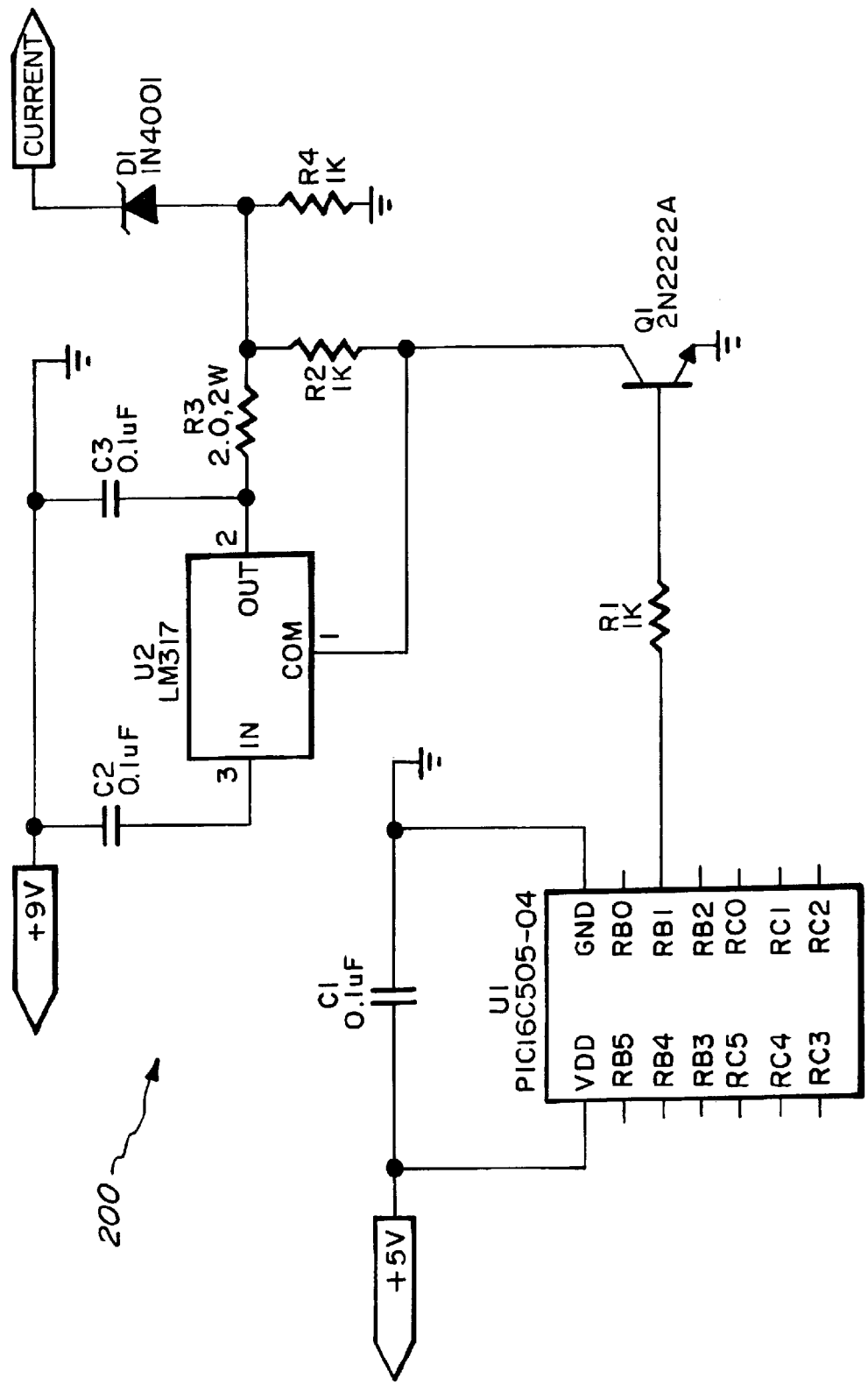
FIG. 5 is a schematic diagram of a timing circuit, which may optionally be used with the battery charging systems of FIGS. 1 and 4.

FIG. 5 shows a timing circuit 200, which may optionally be used with the battery charging system 10 or the battery charging system 100, as a switch that controls the current flow supplied to the battery B1 (32) of the battery charging system 10 or the battery B11 (126) of the battery charging system 100, respectively, by switching the current from the current source on or off. The timing circuit 200 may be used in place of switch S1 (30) of the battery charging system 10 or the switch S11 128 of the battery charging system 100, respectively, or in another appropriate place to control the current flow to the battery B1 (32) of the battery charging system 10 or the battery B11 (126) of the battery charging system 100, respectively. The timing circuit 200 may alternatively be a timing relay, microcontroller timer, or other suitable timer. A microcontroller with a clock speed higher than 1 MHz is preferable, but microcontrollers with other clock speeds may be used. A typical timer element microcontroller that may be used is Microchip PIC16C505 operating at 4 MHz, or other suitable microcontroller.

Figure 6:
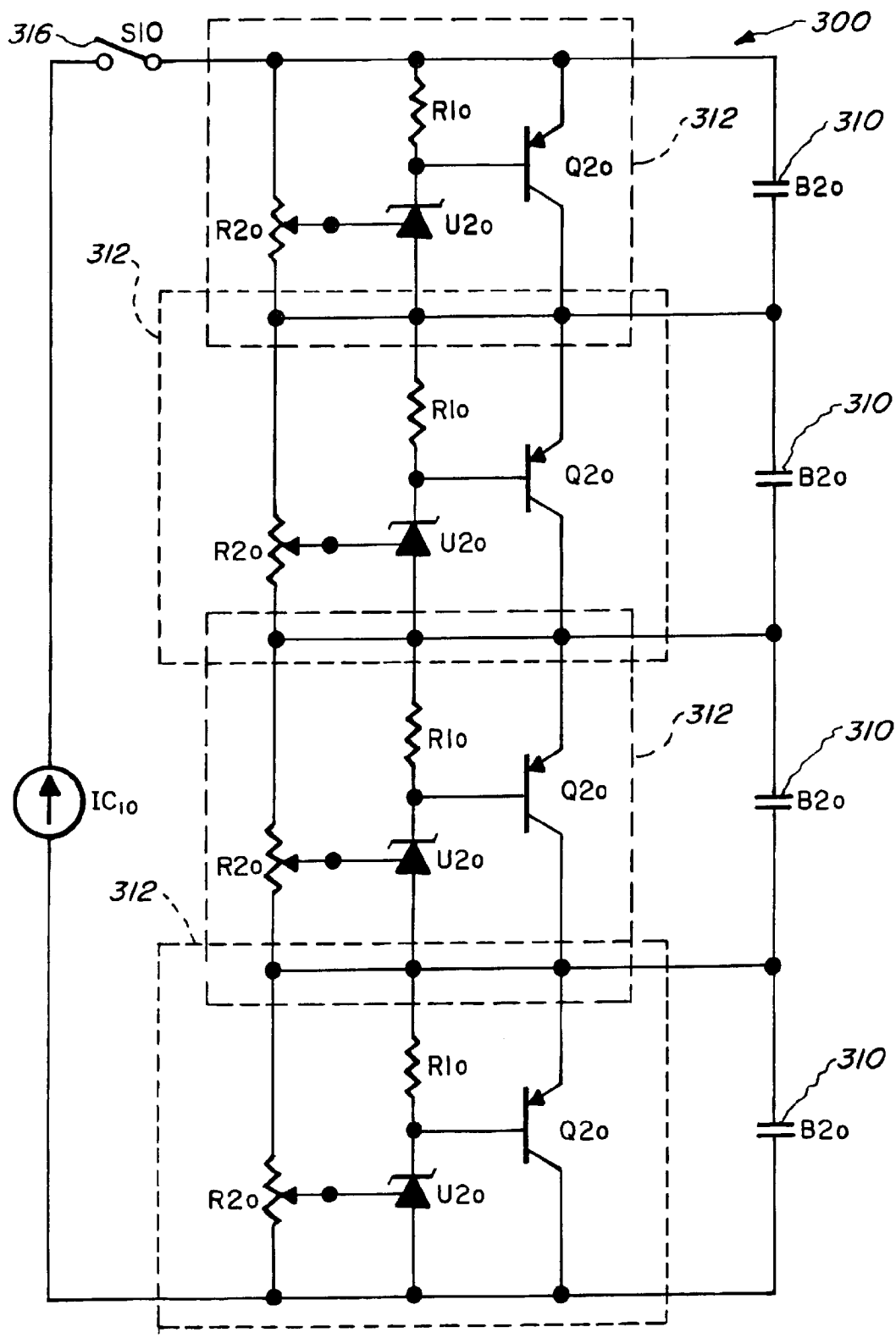
FIG. 6 is a schematic diagram of an alternate embodiment of a battery charging system, constructed in accordance with the present invention.

FIG. 6 shows an alternate embodiment of a battery charging system 300 in which a plurality of batteries B20 (310) may be charged by connecting a plurality of battery voltage and current regulators (312), which are substantially the same as the voltage and current regulators (34) of the battery charging system 10, and driving the battery voltage and current regulators (312) with a single current source IC10 (314) through a switch S10 (316). Each of the battery voltage and current regulators (312) regulates voltage applied to said respective battery B20 (310) and current supplied to said respective battery B20 (310). Each of the battery voltage and current regulators (312) are connected across a respective one of the batteries B20 (310) which are in series, and which are also in series with the current source IC10 (314) and the switch S10 (316), each of the voltage and current regulators (312) also being in series.

Each of the batteries B20 (310) can, thus, be individually charged in series without the necessity of using a plurality of current sources. Battery packs often typically have batteries in series. Thus, all batteries in a battery pack may be individually and independently charged in series to their respective cutoff voltages, thus ensuring a balanced battery back.

Figure 7:
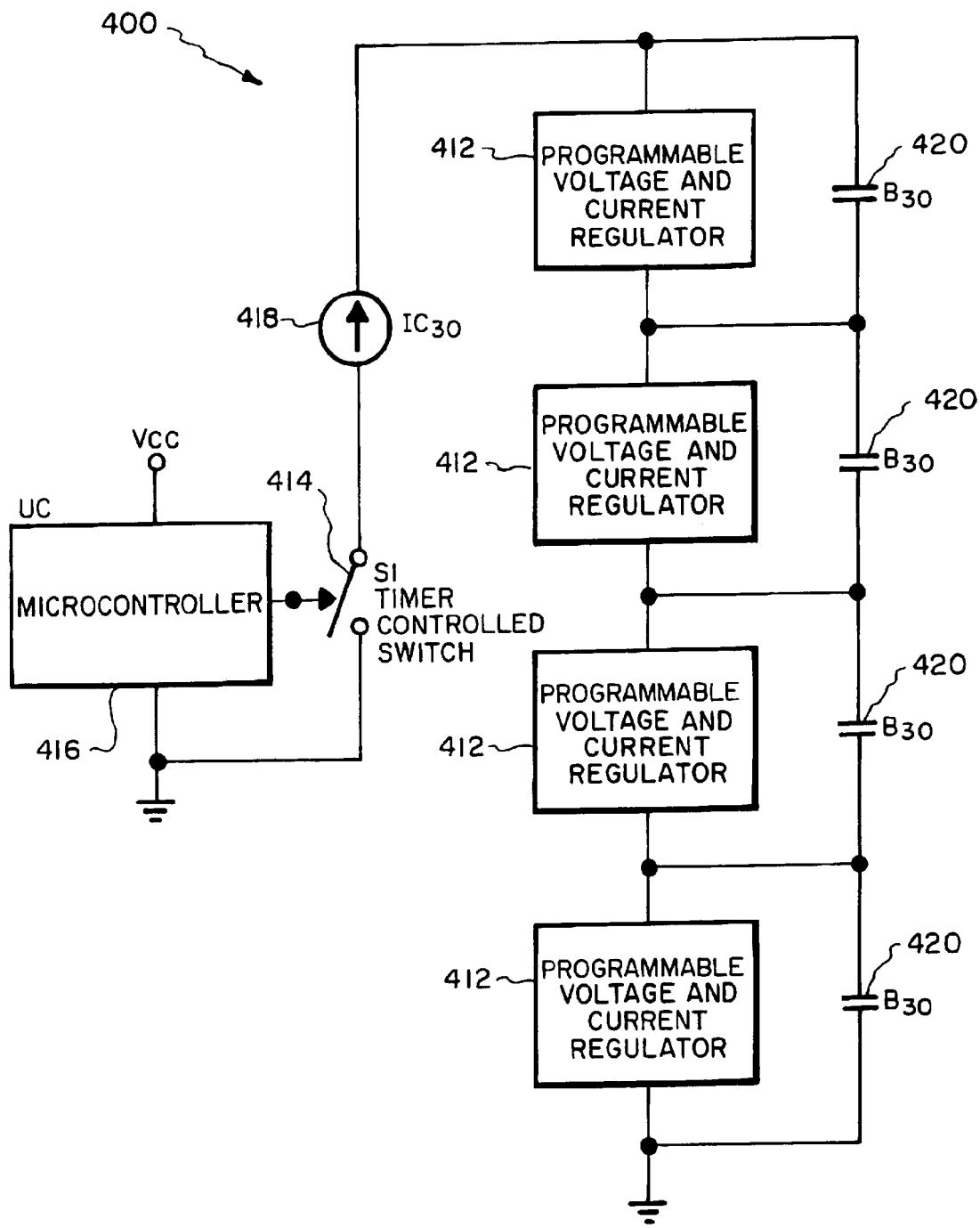
FIG. 7 is a block diagram of an alternate embodiment of a battery charging system, constructed in accordance with the present invention.

FIG. 7 shows an alternate embodiment of a battery charging system 400, which is substantially the same as the battery charging system 300, except that the battery charging system 400 has a plurality of programmable voltage and current regulators 412, and a timer controlled switch 414, which is controlled by microcontroller 416. The timer controlled switch 414 is in series with current source $I_{C30}$ (418) and a plurality of batteries B30 (420), which are also in series with the timer controlled switch 414 and the current source $I_{C30}$ (418). Each of the plurality of programmable voltage and current regulators 412, are connected in series and across a respective one of the batteries B30 (420), each of the voltage and current regulators 412 regulating voltage applied to each of the respective batteries B30 (420) and current supplied to each of the respective batteries B30 (420). Each of the programmable voltage and current regulators 412 may be individually programmed to accept a variety of charging methods and processes.

Each of the batteries B30 (414) can, thus, be individually charged in series without the necessity of using a plurality of current sources. Thus, all batteries in a series battery pack may be individually and independently charged in series to their respective cutoff voltages, thus ensuring a balanced battery back.

The battery charging system 300 of the alternate embodiment of the battery charging system 300 of FIG. 6 and the alternate embodiment of the battery charging system 400 of FIG. 7 regulates, shapes, and shunts current at appropriate voltages via the use of the voltage and current regulators 312 and the programmable voltage and current regulators 412, respectively, while in series and without disconnecting the batteries B20 (310) and the batteries (420), respectively, from the battery charging system 300 and the battery charging system 400.

Figure 8:
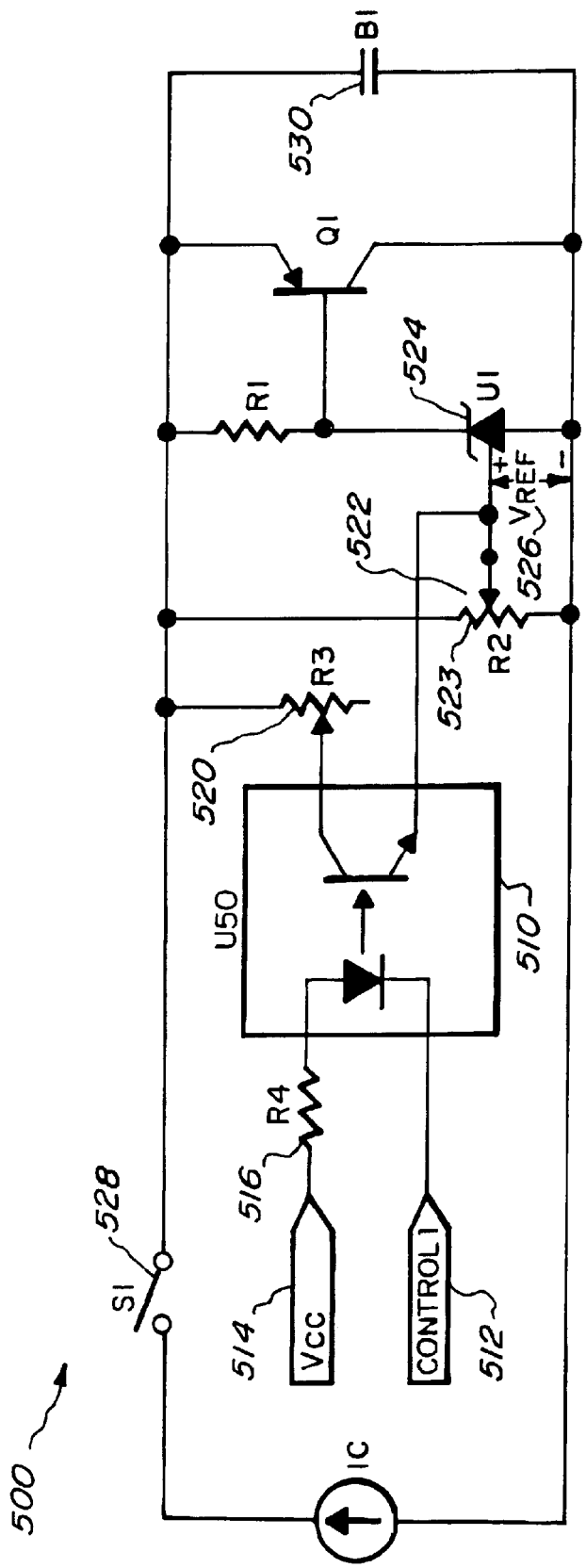
FIG. 8 is a schematic diagram of an alternate embodiment of a battery charging system, constructed in accordance with the present invention.

FIG. 8 shows an alternate embodiment of a battery charging system 500, which is substantially the same as the battery charging system 10, except that the battery charging system 500 may optionally have two end voltages, by the use of an optoisolator U50 (510), which provides a two-level cutoff system. A microcontroller-controlled Control 1 voltage (512) may be set, for example, to either 0 or voltage Vcc (514). The current that arises from a voltage difference between the Control 1 voltage (512) and the voltage Vcc (514) flows through limiting resistor R4 (516), which activates the optoisolator U50 (510), and results in potentiometer resistor R3 (520) being in parallel with upper portion 522 of potentiometer resistor R2 (523). The potentiometer resistor R3 (520) has a large resistance compared with the resistance of the upper portion 522 of the resistor R2 (523). The effective resistance coupled to adjustable band-gap voltage reference diode U1 (524) is reduced, thus providing an offset to zener reference voltage $V_{REF}$ (526) of the adjustable band-gap voltage reference diode U1 (524). Consequently, depending on the value of the Control 1 voltage (512), two cutoff voltages may be used in the battery charging system 500. The cutoff voltages may be programmed to change as a function of time or may be changed, as a result of other instructions, may have fixed values, or may be changed manually, depending upon the needs of the battery charging system 500.

This process for setting up two cutoff voltages may be, for example, implemented as follows: switch S1 (528) is turned on to allow current to flow without battery B1 (530) in the battery charging system 500; the Control 1 voltage (512) is then set, for example, to the voltage Vcc (514); the potentiometer R2 (523) is then adjusted to achieve a high cutoff voltage, across where the battery B1 (530) is to be connected; the Control 1 voltage (512) is then set, for example, to ground, and the potentiometer resistor R3 (520) is then adjusted-to achieve a low cutoff voltage, across where the battery B1 (530) will be connected.

The value of the limiting resistor R4 (516) should be sufficient to allow enough current flow to activate the optoisolator U50 (510), without damaging the optoisolator U50 (510). Typical resistance values for the limiting resistor R4 (516) range from approximately 500 to 1,500 ohms, although other suitable values may be used, depending on the components used and demands placed on the battery charging system 500. The value of the potentiometer resistor R3 (520) is governed by the desired voltage offset, but for the battery-systems considered, the value of the potentiometer resistor R3 (520) is typically between 10 times to 30 times the value of the potentiometer resistor R2 (523), but other ratios may be used depending upon the types of batteries to be charged in the battery charging system 500. Typical values of the potentiometer resistor R2 (523) and the potentiometer resistor R3 (520) are 100K and 2M, respectively, although other values may be used depending upon the types of batteries to be charged in the battery charging system 500.

Figure 9:
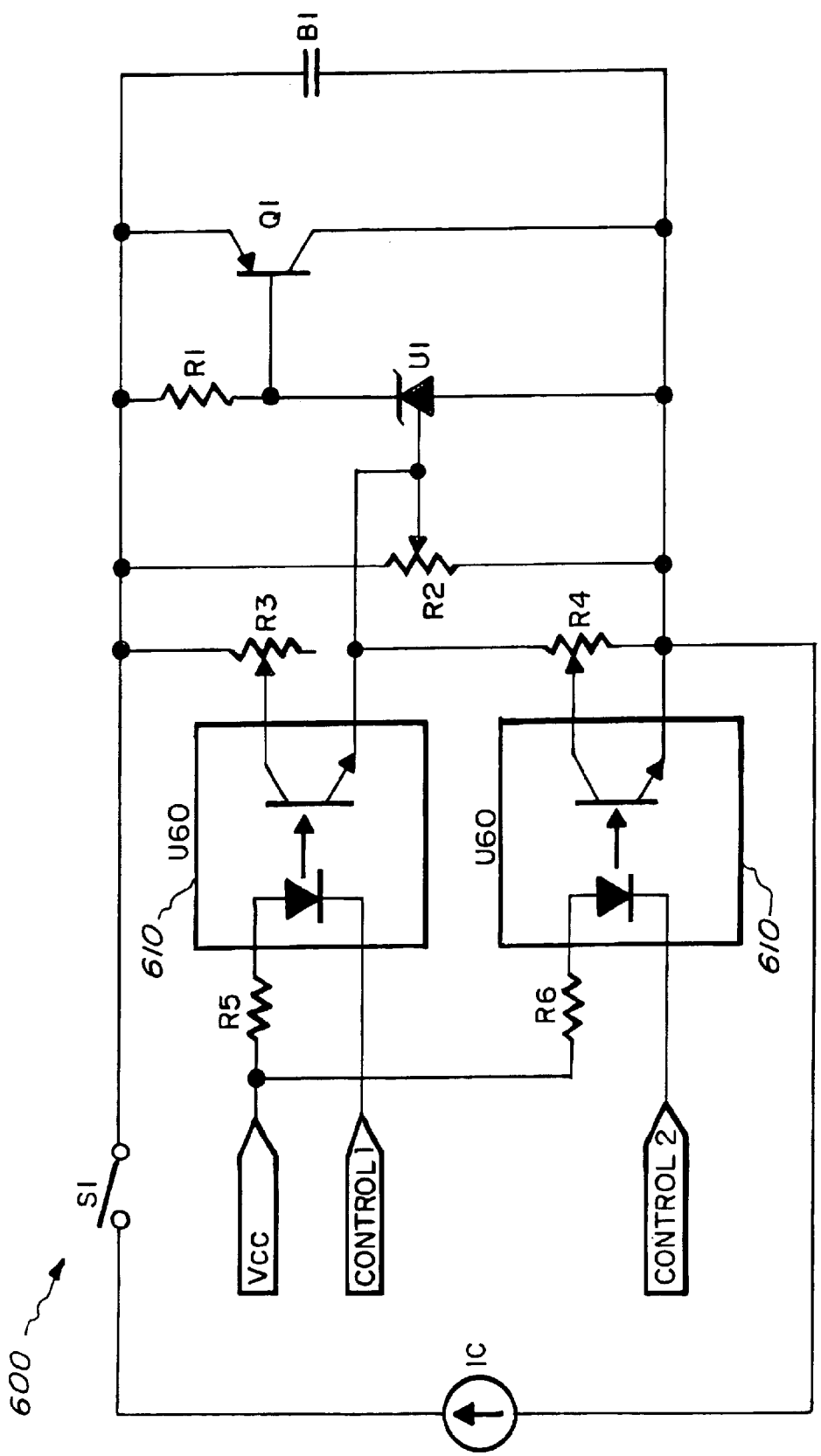
FIG. 9 is a schematic diagram of an alternate embodiment of a battery charging system, constructed in accordance with the present invention.

FIG. 9 shows an alternate embodiment of a battery charging system 600, which is substantially the same as the battery charging system 10, except that the battery charging system 600 may optionally have a plurality of end voltages, by adding additional optoisolators U60 (610). The number of cutoff voltages is one more than the number of optoisolators U60 (610) used in the battery charging system 600. FIG. 9 shows the battery charging system 600 as a 3-level cutoff system. The procedures for setting the cutoff voltages of the battery charging system 600 are substantially similar to setting the cutoff voltages of the battery charging system 500.

Although the present invention has been described in considerable detail with reference to certain preferred versions thereof, other versions are possible. Therefore, the spirit and scope of the appended claims should not be limited to the description of the preferred versions contained herein.

What is claimed is:

1. A battery charging system, comprising:
   a current source;
   a plurality of batteries connected in series;
   said current source in series with said batteries;
   a plurality of voltage and current regulators, each said voltage and current regulator connected across a respective one of said batteries, each said voltage and current regulator regulating voltage applied to said respective battery and current supplied to said respective battery, each of said voltage and current regulators also being connected in series and comprising an adjustable band-gap voltage reference diode in series with a resistor, said series resistor and said band-gap voltage reference diode connected across said respective battery, said adjustable band-gap voltage reference diode having a reference input;
   a voltage divider potentiometer connected across said respective battery, said voltage divider potentiometer having an output connected to said reference input of said adjustable band-gap voltage reference diode, and providing a reference input voltage at said reference input to said band-gap voltage reference diode; and
   a transistor having an emitter and a collector connected across said respective battery, said transistor having a base connected to a junction between said series connected resistor and said band-gap voltage reference diode, said band-gap reference diode, said series resistor, and said transistor operating in conjunction with one another to regulate voltage applied to said respective battery and current supplied to said respective battery.

2. The battery charging system according to claim 1, wherein further said battery charging system has a switch in series with said current source to control current supplied to said batteries by switching said current source on or off.

3. The battery charging system according to claim 1, wherein said switch is timer controlled.

4. The battery charging system according to claim 1, wherein said timer controlled switch is a microcontroller.

5. The battery charging system according to claim 1, wherein further said battery charging system has means for incorporating at least one additional reference input voltage at said reference input to said band-gap voltage reference diode.

6. The battery charging system according to claim 1, wherein further each said voltage and current regulator is programmable.

* * * * *